(No Model.) 2 Sheets—Sheet 1.
R. C. SCHUPPHAUS & M. T. WHITE.
APPARATUS FOR THE MANUFACTURE OF PYROXYLINE.
No. 406,597. Patented July 9, 1889.
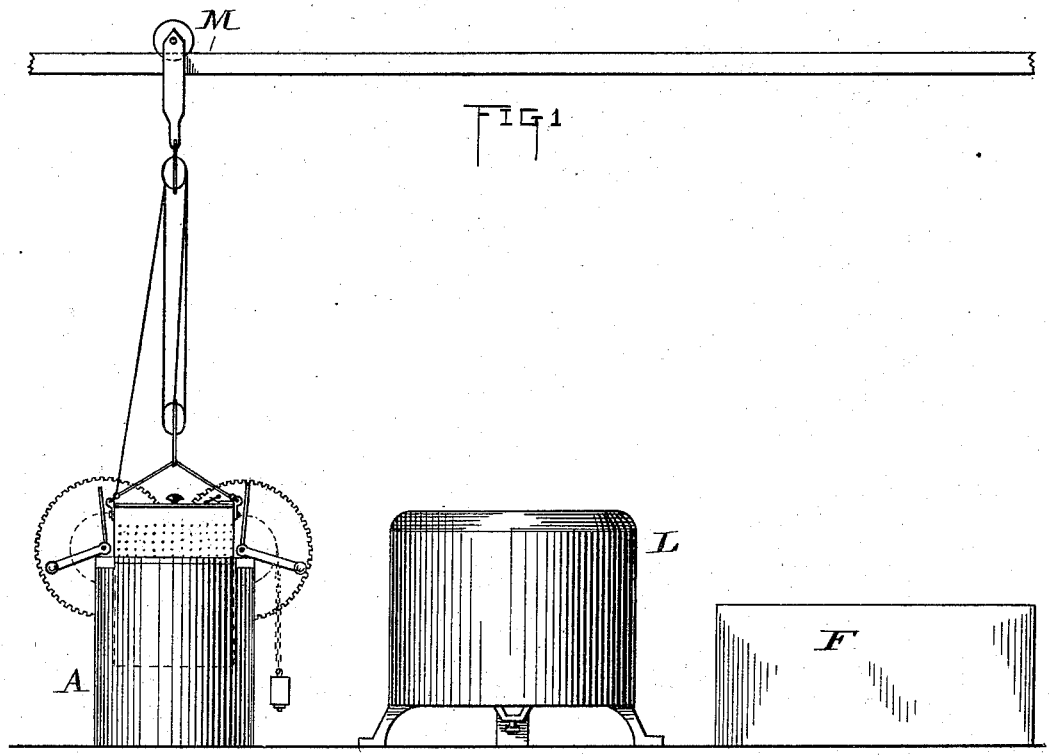
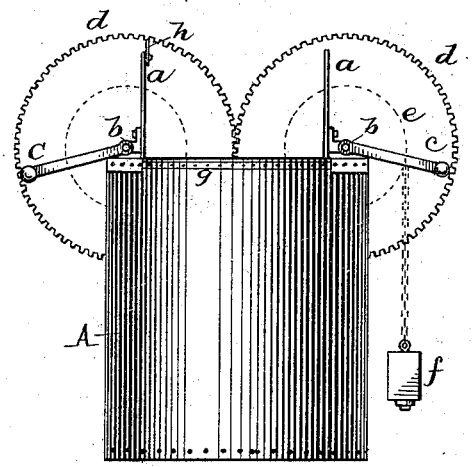
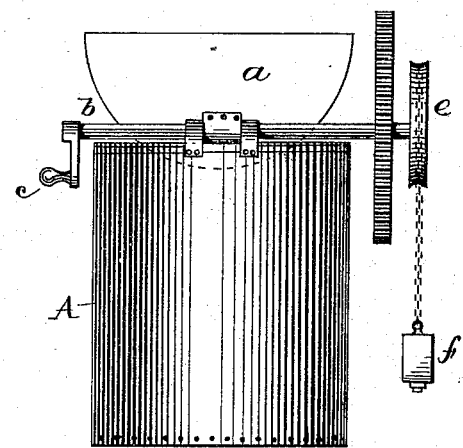
WITNESSES:
INVENTORS
Robert C. Schupphaus
Merritt T. White
BY
ATTORNEYS.

(No Model.) 2 Sheets—Sheet 2.
R. C. SCHUPPHAUS & M. T. WHITE.
APPARATUS FOR THE MANUFACTURE OF PYROXYLINE.
No. 406,597. Patented July 9, 1889.
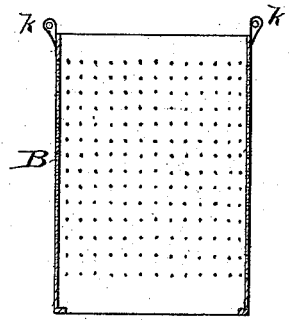
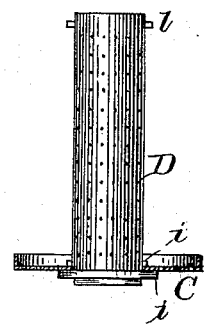
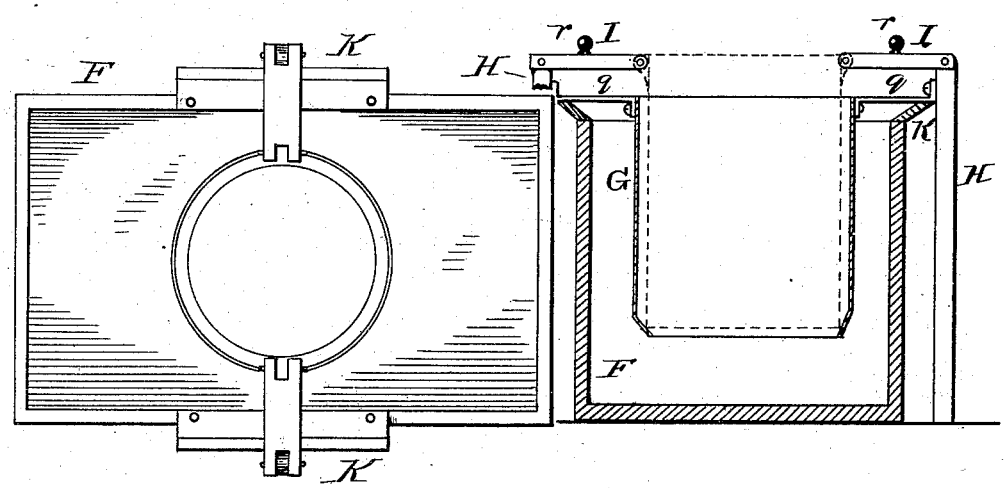
WITNESSES:
INVENTORS
BY
ATTORNEYS.

UNITED STATES PATENT OFFICE.

ROBERT C. SCHUPPHAUS, OF ADAMS, MASSACHUSETTS, AND MERRITT T. WHITE, OF NEWARK, NEW JERSEY.

APPARATUS FOR THE MANUFACTURE OF PYROXYLINE.

SPECIFICATION forming part of Letters Patent No. 406,597, dated July 9, 1889.

Application filed January 28, 1889. Serial No. 297,761. (No model.)

*To all whom it may concern:*

Be it known that we, ROBERT C. SCHUPPHAUS, a subject of the Emperor of Germany, residing at Adams, in the county of Berkshire, in the State of Massachusetts, and MERRITT T. WHITE, a citizen of the United States, residing at Newark, in the county of Essex, in the State of New Jersey, have jointly invented a certain new and useful Improvement in Apparatus for the Manufacture of Pyroxyline, of which the following is a specification.

In our application filed January 3, 1889, is set forth a process of manufacturing pyroxyline, the main object of which was to avoid the necessity of handling the material to as great an extent as possible during the whole process of manufacture, and also to insure the perfect conversion of the material.

Our present invention relates to the apparatus employed in this process, which is shown and described, but not claimed, in the application above referred to. Such apparatus is illustrated in the accompanying drawings.

Figure 1 is a general view illustrating the arrangement of the apparatus employed in the entire process; Fig. 2, a side view of one of the nitrating-pots; Fig. 3, a front view of the same; Fig. 4, a vertical section of the perforated cage with the cover removed; Fig. 5, a view in elevation of the internal tube of said cage, showing the bottom of the cage in cross-section; Fig. 6, a side view of the cover of the cage; Fig. 7, a top view of the dumping-trough, and Fig. 8 a vertical cross-section of the same.

A represents the nitrating-pot, a suitable number of which are used. The pot is provided with a cover made in halves $a$ $a$, each of which is carried by a hinged shaft $b$. Each shaft is provided with a handle $c$ for turning it, and at its other end with a toothed wheel $d$, the two wheels engaging with each other, so that both covers may be opened or closed by turning either of the cranks $c$ $c$. One of the shafts $b$ carries a pulley $e$, provided with a chain and weight $f$, which balances the covers, so that they are made to work more easily. The edge of the pot is provided with a flange $g$ for holding a packing of asbestus or other suitable material, and one of the covers may have a flange attached to it at $h$ for the same purpose. The edges of the covers may also be provided with similar packing, so that close joints are formed and the pot is closed tightly from exposure to the atmosphere.

For immersing the cellulose in the acid contained in the pot A we employ a cage or perforated receptacle B. Such receptacle is made of suitable metal, and is provided with numerous perforations throughout its sides and its cover and bottom. The bottom C of the cage is removable therefrom, being attached to a perforated tube D, which extends up within the cage concentric therewith and to which the bottom plate C is secured by screw-threaded rings $i$ $i$. The cage has an internal flange for receiving the bottom plate. The cage is provided with lugs $k$, to which hooks may be attached for the purpose of hoisting the cage, and the tube D has a bolt $l$, extending across its upper part for the same purpose. The cover E of the cage has a handle $m$ and two bolts at opposite sides which engage with holes in the sides of the cage, the bolt $n$ being a stationary bolt and the bolt $o$ a sliding bolt, the latter being provided with a lever $p$ for turning it, such lever having a weight for holding the bolt forward when the cage is in rapid motion in the centrifugal machine.

The dumping-trough consists of a large water-tank F, within which is placed a cylinder G, which is supported above the water-line of the tank by arms $q$, which extend out to standards or supports H outside the tank. At the top of each standard H is a hinged arm I, such arms being forked at their inner ends and provided with handles $r$ for raising them. The trough is preferably provided at that part of its sides opposite the cylinder G with flaring ribs K.

The apparatus includes, in addition to the parts already described, a centrifugal dryingmachine L. The nitrating pot or pots, the centrifugal machine, and the dumping-trough are arranged in suitable relation to one another, and preferably an overhead rail is provided with a trolley M, traveling upon it, for transporting the cage from one place to another.

The operation of the device above described is as follows: The pot A is filled with the acid solution in the usual way, and the cage B filled with the cellulose, which is usually in the form of strips or shreds of tissue-paper, is lowered into the pot, and the covers of said pot are closed. Such covers remain closed during the nitration, so that during this process the cellulose is not in contact with the atmosphere. Heretofore the cellulose has been placed directly in the acid, and workmen have been employed to stir it about in order that the acid may reach every part of the material, and finally the whole mass of material had to be transferred to the centrifugal machine, and thence to the dumping-trough, whereby a loss of acid and of cellulose always occurs. We, however, keep the material confined in a cage, and it being in annular form and exposed to the action of the acids on all sides and at the top and bottom of the annulus the acid mixes freely and thoroughly therewith and a better and more uniform product is insured. After the nitration is thoroughly effected the pot is opened and the cage is hoisted therefrom and allowed to drain into the pot and is then transferred to the centrifugal machine, in which the cage itself is placed and takes the place of the whizzer-basket of the machine, being subjected to rapid whirling motion until the nitro-cellulose is deprived of most of the adhering acid. The cage being then hoisted from the centrifugal machine, it is conveyed to the dumping-trough and lowered into the cylinder G, which forms a holder for such cage, and is secured there by pins passing through the forked ends of the arms I and through the lugs $k$ on the cage. The cage being securely held into position, hooks are attached to the ends of the bolt $l$ on the tube D, and such tube and the movable bottom C of the cage are raised, which results in forcing the cellulose out over the sides of the cage into the trough, where it is washed by running water in the usual way. It will be seen that this provides an exceedingly convenient and effective method of emptying the cage and transferring the material to the dumping-trough. The inclined flanges K prevent the material from falling over the sides of the tank.

We do not mean to claim herein the process of making pyroxyline, which consists in subjecting a confined body of cellulose to treatment in a nitrating solution, whether cut off from the atmosphere or open thereto, or the subsequent operations which said confined body of cellulose is subjected to, to make pyroxyline, the same being claimed in an application filed by us on January 3, 1889, Serial No. 295,337, the present application being confined to the apparatus employed in carrying out such process.

What we claim is—

1. In an apparatus for the manufacture of pyroxyline, the combination of a nitrating-pot and a removable receptacle for containing the cellulose, substantially as set forth.

2. In an apparatus for the manufacture of pyroxyline, the combination of a nitrating-pot and a removable perforated receptacle for containing the cellulose, substantially as set forth.

3. In an apparatus for the manufacture of pyroxyline, the combination of a nitrating-pot, an independent receptacle adapted to contain the cellulose, and covers for said nitrating-pot and independent receptacle, whereby the atmosphere is cut off from said nitrating-pot and receptacle, substantially as set forth.

4. In an apparatus for the manufacture of pyroxyline, the combination of a nitrating-pot, an independent removable receptacle for containing the cellulose adapted to be inserted in the nitrating-pot, a centrifugal machine, and a traveling carrier for conveying said removable receptacle from said nitrating-pot to said centrifugal machine, substantially as set forth.

5. In an apparatus for the manufacture of pyroxyline, the combination of a nitrating-pot, a centrifugal machine, a dumping-trough, a cage for containing the cellulose, and a traveling carrier for conveying said cage from said nitrating-pot to the centrifugal machine and dumping-trough successively, substantially as set forth.

6. In an apparatus for the manufacture of pyroxyline, the combination, with a dumping-trough provided with a water-space and a chamber to receive a charge of nitrated cellulose, of a receptacle for said nitrated cellulose adapted to fit within said chamber, and means for discharging the contents of said receptacle into said water-space, substantially as set forth.

7. In an apparatus for the manufacture of pyroxyline, the receptacle for the cellulose having in combination the cage perforated on all sides and having a perforated bottom and cover, and a perforated tube having an open bottom within said receptacle, substantially as set forth.

8. In an apparatus for the manufacture of pyroxyline, the cage for receiving the cellulose having a vertically-sliding bottom and means for lifting said bottom, substantially as set forth.

9. In an apparatus for the manufacture of pyroxyline, the receptacle for the cellulose having in combination the external cage, the internal tube, and the vertically-sliding bottom for such cage attached to said tube, substantially as set forth.

10. In an apparatus for the manufacture of pyroxyline, the dumping-trough provided with a holder for receiving the cellulose-receptacle, substantially as set forth.

11. In an apparatus for the manufacture of pyroxyline, the dumping-trough and a holder for the cellulose-receptacle, in combination with means for securing said receptacle in said holder, substantially as set forth.

This specification signed and witnessed by ROBERT C. SCHUPPHAUS the 15th day of January, 1889, and by MERRITT T. WHITE the 26th day of January, 1889.

ROBERT C. SCHUPPHAUS.
MERRITT T. WHITE.

Witnesses to the signature of Robert C. Schupphaus:
JAMES W. SUTHERLAND,
HARVEY C. PIERCE.

Witnesses to the signature of Merritt T. White:
D. H. DRISCOLL,
W. PELZER.